United States Patent [19]

Ishikuro et al.

[11] Patent Number: 4,851,288

[45] Date of Patent: Jul. 25, 1989

[54] MAGNETIC RECORDING MEDIUM

[75] Inventors: Tadashi Ishikuro; Kouiti Mochizuki; Masaaki Fujiyama, all of Kanagawa, Japan

[73] Assignee: Fuji Photo Film Co., Ltd., Kanagawa, Japan

[21] Appl. No.: 107,428

[22] Filed: Oct. 13, 1987

[30] Foreign Application Priority Data

Oct. 13, 1986 [JP] Japan ................. 61-241501

[51] Int. Cl.$^4$ ............................ G11B 5/70
[52] U.S. Cl. ................... 428/329; 428/694; 428/900
[58] Field of Search ............ 428/403, 329, 694, 900

[56] References Cited

U.S. PATENT DOCUMENTS

| 4,400,435 | 8/1983 | Yoda | 428/694 |
|---|---|---|---|
| 4,420,531 | 12/1983 | Takuda | 428/329 |
| 4,420,537 | 12/1983 | Hayama | 428/694 |
| 4,444,835 | 4/1984 | Togawa | 428/329 |
| 4,465,735 | 8/1984 | Togawa | 428/329 |
| 4,529,661 | 7/1985 | Ninomiya et al. | 428/694 |
| 4,582,754 | 4/1986 | Ryoke | 428/329 |

*Primary Examiner*—Paul J. Thibodeau
*Attorney, Agent, or Firm*—Sughrue, Mion, Zinn, Macpeak & Seas

[57] ABSTRACT

A magnetic recording medium having a magnetic layer is disclosed, comprising co-absorbed γ-iron oxide particles as ferromagnetic particles and binders, wherein coercive force of Hc of the magnetic recording medium is 850 Oe or more and the ratio of the coercive force Hc and saturated magnetic flux density Bm thereof is 0.5/1 or less.

6 Claims, No Drawings

MAGNETIC RECORDING MEDIUM

FIELD OF THE INVENTION

The present invention relates to a magnetic recording medium, and more particularly it relates to a magnetic recording medium mainly containing as ferro-magnetic particles co-absorbed γ-iron oxide and having excellent outputs as well as C/N (carrier/noise ratio).

BACKGROUND OF THE INVENTION

A magnetic recording medium used as a video tape for VHS and β types generally has coercive force Hc of from 600 to 700 Oe and has saturated magnetic flux density Bm of about 1,500 G. The demand for increasingly higher density recording that has recently arisen for magnetic recording media has led to the situation that the above-described coercive force Hc and the saturated magnetic flux density Bm are not electromagnetically sufficient to satisfy the noted demand. A magnetic tape (referred to as a metal tape) using metal particles as magnetic particles, which has recently been put into practical use as an 8 mm video tape, has high coercive force (Hc), such as from 1,400 to 1,500 Oe, and high saturated magnetic flux density Bm, such as 3,000 G or more. Accordingly, it has drawn much attention as a magnetic recording medium suitable for high density recording.

However, with such a high coercive force (Hc), there is a problem that a ferrite head typically used for decks of VHS or β type cannot sufficiently record and accordingly cannot be used, because the recording densities of the head itself are saturated.

SUMMARY OF THE INVENTION

An object of the present invention is to provide a magnetic recording medium which can record with such a generally used ferrite head for decks of VHS and β types, and exhibits higher outputs and higher C/N than those tapes of VHS and β types used at present.

As a result of extensive research regarding a magnetic recording medium which can sufficiently record and reproduce with a ferrite head and has excellent electromagnetic properties, the inventors of the present invention have found that such recording and reproducing operations can be satisfactorily accomplished by using a magnetic recording medium having a magnetic layer comprising Co-absorbed γ-iron oxide particles as ferromagnetic particles and binders, having coercive force Hc of the magnetic recording medium of 850 Oersted (Oe) or more and having a ratio of the coercive force Hc and saturated magnetic flux density Bm (Hc/Bm) of 0.5/1 or less.

DETAILED DESCRIPTION OF THE INVENTION

The present invention is described in more detail below.

In the magnetic recording medium, the crystal size (corresponding to an average length in the short axis) of the above Co-absorbed γ-iron oxide particle is preferably from 200 to 400 Å, improved dispersibility is provided by using a binder having a polar group of a metal salt of sulfonic acid, carboxylic acid or phosphoric acid on a side chain, and the squareness ratio (residual magnetic flux density Br/saturated magnetic flux density Bm) is 0.85/1 or more.

More preferably in the magnetic recording medium, the crystal size of the Co-absorbed γ-iron oxide particle is from 200 to 300 Å, the coercive force Hc is from 850 to 1,000 Oe, the ratio of coercive force Hc and the saturated magnetic flux density Bm is from 0.3/1 to 0.5/1 and the squareness ratio is from 0.87/1 to 0.95/1.

That is, the suitable ferromagnetic particles used in the present invention are Co-absorbed γ-rion oxide particles. Regarding the characteristics of ferromagnetic particles, the coercive force Hc is preferably from 850 to 1,200 Oe, crystal size of the particles is preferably from 200 to 400 Å, the Co content (Co/Co+Fe) is preferably 10 atom % or less based on a total weight of the cobalt and iron oxide particles and the proportion of $Fe^{2+}$ with respect to $Fe^{3+}$ is preferably 10% or less.

More preferably the coercive force Hc is from 850 to 1,000 Oe, the crystal size is from 200 to 300 Å, the Co content is from 4 to 7 atom % based on a total weight of the cobalt and iron oxide particles and the proportion of $Fe^{2+}$ with respect to $Fe^{3+}$ is from 5 to 9%. Prior to dispersion, ferromagnetic particles can be soaked in a solvent having dissolved therein dispersing agents, lubricating agents, antistatic agents, and the like, to adsorb such agents onto the surface of the ferromagnetic particles.

Suitable binders that can be used in the present invention include conventionally known thermoplastic resins, thermosetting resins, reactive type resins, and mixture thereof.

The thermoplastic resins are those having a softening point of 150° C. or lower, an average molecular weight of from 10,000 to 300,000, and a degree of polymerization of about 50 to 1,000, such as, for example, a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, a urethane elastomer, a resin of nylon and silicon type, a nitrocellulose and polyamide resin, polyvinyl fluoride, a copolymer of vinylidene chloride and acrylonitrile, a copolymer of butadiene and acrylonitrile, a polyamide resin, polyvinyl butyral, a cellulose derivative (e.g., cellulose acetate butyrate, cellulose diacetate, cellulose triacetate, cellulose propionate, nitrocellulose and the like), a copolymer of styrene and butadiene, a polyester resin, a copolymer of chlorovinyl ether and acrylate, an amino resin, various synthetic rubber type thermoplastic resins and mixtures thereof.

Examples of such resins are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

The resin preferred as binders are thermoplastic resins having a polar group selected from the group consisting of

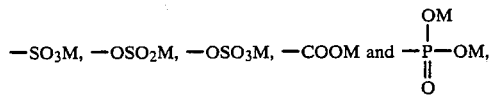

wherein M represents H, Li, Na, or K, and particularly such a copolymer of vinyl chloride type is preferred.

The thermosetting resins or reactive type resins have a molecular weight of 200,000 or less in the state of a coating solution and the molecular weight becomes infinite by the reaction of condensation or adduction caused by heating after coating and drying. Particularly, those resins that do not soften nor melt until they are heat-decomposed are preferred. Specific examples of such resins include phenol resins, epoxy resins, polyurethane hardenable resins, urea resins, melamine resins, alkyd resins, silicon resins, acryl type reactive resins, epoxy and polyamide resins, nitrocellulose melamine resins, a mixture of high molecular weight polyester resins and isocyanate prepolymers, a mixture of methacrylate copolymers and diisocyanate prepolymers, a mixture of polyester polyol and polyisocyanate, urea formaldehyde resins, a mixture of a low molecular weight glycol, a high molecular weight diol and triphenylmethane triisocyanate, polyamine resins and the mixture thereof.

Those resins are disclosed in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, and 28922/72.

The above-described binders can be used alone or in combination, and additives can be added thereto. The binders are generally employed in an amount of from 5 to 300 parts by weight and preferably from 10 to 100 parts by weight, based on 100 parts by weight of ferromagnetic particles.

The additives include dispersing agents, lubricating agents, abrasive agents, and the like.

Polyisocyanates used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, a product of the above isocyanates with polyalcohol, and polyisocyanates produced by the condensation reaction of isocyanates. These polyisocyanates are commercially available, e.g., under the trademarks of "Collonate L", "Collonate HL", "Collonate 2030", "Collonate 2031", "millionate MR", "Millionate MTL" (manufactured by Nippon Polyurethane Co., Ltd.), "Takenate D-102", "Takenate D-110N", "Takenate D-200", "Takenate D-202" (manufactured by Takeda Chemical Industries, Ltd.), "Desmodule L", "Desmodule IL", "Desmodule N", "Desmodule HL" (manufactured by Sumitomo Bayer Co., Ltd.), which can be used alone or in combination using the difference of hardenable reactions.

Suitable dispersing agents used in the present invention include fatty acids ($R_1COOH$, where $R_1$ is an alkyl group having from 9 to 21 carbon atoms) having from 10 to 22 carbon atoms, such as caprylic acid, capric acid, lauric acid, myristic acid, palmitic acid, stearic acid, oleic acid, elaidic acid, linolic acid, linolenic acid or stearol, metal soaps of alkali metals(e.g., Li, Na, K and so on) or alkali earth metals (e.g., Mg, Ca, Ba and so on), Cu, Pb, etc., and fatty acid; and lecithin. Higher alcohols having 10 or more carbon atoms and sulfate and phosphate can additionally be used. These dispersing agents are used in an amount of from 0.05 to 20 parts by weight, and preferably from 0.1 to 10 parts by weight, based on 100 parts by weight of the binder. These dispersing agents can be coated on the surface of ferromagnetic particles and non-magnetic particles before dispersion, or can be added during the dispersing step. Examples of such dispersing agents are disclosed in Japanese Patent Publication Nos. 28369/64, 17945/69, 15001/73, and U.S. Pat. Nos. 3,387,993 and 3,470,021.

The suitable lubricating agents used in the present invention include silicon oil, graphite, molybdenum disulfide, boron nitride, fluorinated graphite, fluorinated alcohol, polyolefin (e.g., polyethylene wax and the like), polyglycol (e.g., polyethylene oxide wax and the like), alkyl phosphate, polyphenyl ether, tungsten disulfide, fatty acid esters composed of monobasic fatty acid having from 10 to 20 carbon atoms and one or two of monohydric through hexahydric alcohols having from 3 to 12 carbon atoms and fatty acid esters having from 11 to 35 carbon atoms composed of monobasic fatty acid having 10 or more carbon atoms and monohydric through hexahydric alcohols. Fatty acids, fatty acid amide, and aliphatic alcohol having from 8 to 22 carbon atoms can also be used. The specific examples of organic lubricating agents include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearat, anhydrosorbitan tetrastearate, oleyl alcohol, and lauryl alcohol. Lubricating oil additives can be used alone such as antioxidants (e.g., alkylphenol and so on), rust preventing agents (e.g., naphthenic acid, alkenyl succinic acid, dilauryl phosphate and the like), oily agents (e.g., rapeseed oil, lauryl alcohol, and so on), extreme pressure additives (e.g., dibenzyl sulfide, tricresyl phosphate, tributyl phosphite and so on), detergent dispersants, viscosity index improvers, pour point depressant, and defoaming agents. These agents are generally added in an amount of from 0.05 to 20 parts by weight and preferably from 5 to 18 parts by weight, based on 100 parts by weight of binder. Such additives are disclosed in Japanese Patent Publication Nos. 23889/68, 24041/73, 18482/73, 28043/72, U.S. Pat. Nos. 3,423,233, 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7, p. 779 (December, 1966); *Elektronik*, 1961, No. 12, p. 380; *Kagaku Binran (Manual of Chemistry)*, Applied Edition, pp. 954–967, published by Maruzen Co., Ltd., 1980.

The suitable antistatic agents used in the present invention include electroconductive fine particles such as carbon black, graphite or carbon black graft polymer; natural surface active agents such as saponin; nonionic surface active agents such as alkylene oxide type agent, a glycerin type agent or glycidol type agent, polyhydric alcohol, polyhydric alcohol ester, or alkylphenol EO (ethylene oxide) adduct product; cationic surface active agents such as higher alkyl amines, cyclic amines, hydantoin derivatives, amide amines, ester amides, quaternary ammonium salts, pyridine, and other heterocyclic compounds, phosphonium or sulfonium salts; anionic surface active agents such as carboxylic acid, a sulfonic acid, a phosphoric acid, or a compound having sulfate or phosphate moiety; and amphoteric surface active agents such as amino acid, aminosulfonic acids, or a sulfate or a phosphate of amino-alcohol or alkyl betaine type agents. Such surface active agents used as an antistatic agent are disclosed in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, German Patent (OLS) No. 1,942,665, British Patent No. 1,077,317 and 1,198,450, *Synthesis of Surface Active Agents and the Applied Technology Thereof*, by Ryohei Oda et al., published by Maki Shoten in 1972; A. W. Baily, *Surface Active Agents*, Interscience publication corporation, 1958 Edition; T. P. Sisley, *Encyclopedia of Surface Active Agents*, Vol. 2, Chemical Publish Company, 1964 Edition; *Kaimen Kasseizai Binran (Manual of Surface Active Agents)*, Sixth Edition, Sangyo Tosho Co., Ltd. (Dec. 20, 1966); and Hideo Marumo, *Taidenboshizai (Antistatic Agents)*, Saiwai Shobo, 1968.

Such surface active agents can be used alone or in combination. Those surface active agents are used as an antistatic agent, and are used in many cases for improving dispersion, magnetic characteristics and lubricating property and are used as a coating aid.

The suitable carbon black used in the present invention is furnace for rubber, thermal for rubber, black for color use and acetylene black. Specific examples of carbon black used include those classified in U.S.A. as SAF, ISAF, IISAF, T, HAF, SPF, FF, FEF, HMF, GPF, APF, SRF, MPF, ECF, SCF, CF, FT, MT, HCC, HCF, MCF, LFF, and RCF. That is, carbon black classified at D-1765-82a in U.S. ASTM standard can be used. Carbon black used in the present invention generally has an average particle size of from 10 to 1,000 millimicrons (electromicroscope), a specific surface area measured by a nitrogen adsorption method of from 1 to 800 m$^2$/g, a pH of from 6 to 11 (JIS standard K-6221-1982 method), and a DBP (dibutyl phthalate) oil absorption of from 10 to 400 ml/100 g (JIS standard K-6221-1982 method). Carbon black having a particle size (average diameter) of from 10 to 100 millimicrons is used to reduce surface electric resistance of a coated film and carbon black having a particle size of from 50 to 1,000 millimicrons is used to control strength of a coated film. Carbon black having a particle size of 100 millimicrons or less is used to smooth the surface of a coated film, thereby reducing a spacing loss, and carbon black having a particle size of 50 millimicrons or more is used to roughen the surface of a coated film, thereby reducing the friction coefficient. In this manner, kinds and additive amounts of carbon black can optionally be selected depending upon the particular purposes of usage. Carbon black may also be surface-treated with a dispersing agent referred to hereinafter, or may be grafted with resins. Upon preparing carbon black, the temperature of a furnace may be raised to 2,000° C. or higher to obtain the carbon black of which the surface is partially graphitized. As a special carbon black, hollow carbon black can also be used in the present invention. It is desirable that carbon black be used in an amount of from 0.1 to 20 parts by weight, and preferably from 0.3 to 10 parts by weight, based on 100 parts by weight of ferromagnetic particles. Carbon black used in the present invention can be referred to, for example, *Carbon Black Binran (Manual of Carbon Black)*, published by the Carbon Black Institute in 1971.

Organic solvents that can be used for dispersing, mixing, kneading and coating include ketones such as acetone, methyl ethyl ketone, methyl isobutyl ketone, cyclohexanone, isophorone or tetrahydrofuran; alcohols such as methanol, ethanol, propanol, butanol, isobutyl alcohol, isopropyl alcohol or methyl cyclohexanol; esters such as methyl acetate, ethyl acetate, butyl acetate, isobutyl acetate, isopropyl acetate, ethyl lactate, or glycol acetate; glycol ethers such as ether, monoethyl ether, glycol dimethyl ether, glycol monoethyl ether, or dioxane; tars (aromatic hydrocarbons) such as benzene, toluene, xylene, cresol, chlorobenzene or styrene; chlorinated hydrocarbons such as methylene chloride, ethylene chloride, carbon tetrachloride, chloroform, ethylene chlorohydrin or dichlorobenzene; N,N-dimethylformaldehyde, and hexane.

The methods for mixing and kneading are not particularly limited, and the order of adding each ingredient can be optionally selected. Upon preparing a magnetic coating composition, a conventionally used mixing and kneading machine can be used, such as a two-rod roll mill, a three-rod roll mill, a ball mill, a pebble mill, a Trommel, a sand grinder, Szegvari, an attritor, a high speed impeller, a dispersing machine, a high speed stone mill, a high speed impact mill, a Disper, a kneader, a high speed mixer, a ribbon blender, a coknneader, an intensive mixer, a tumbler, a blender, a disperser, a homogenizer, a single axial screw extruding machine, a biaxial screw extruding machine, or an ultrasonic dispersing machine. An example of a technique for mixing, kneading, and dispersing is disclosed in detail in T. C. Patton, *Paint Flow and Pigment Dispersion*, John Wiley & Sons (1964), Shinichi Tanaka, *Kogyo Zairyo (Industrial Materials)*, Vol. 25, p. 37 (1977), and U.S. Pat. Nos. 2,581,414 and 2,855,156. In the present invention, a magnetic coating composition can be prepared by mixing, kneading and dispersing in accordance with the method as disclosed in the above disclosures.

A magnetic recording layer is prepared by dissolving the above-described ingredients, combined to prepare a coating solution, coating the resulting coating solution on a support, and then drying it. When the magnetic recording layer is used as a tape, the support generally has a thickness of from 2.5 to 100 microns, and preferably from 3 to 70 microns. In the case of a disk or a card, a support has a thickness of from 0.5 to 10 mm and preferably from 0.5 to 3 mm. In the case of a drum, a cylindrical support can be used.

The suitable materials for a support include polyesters such as polyethylene terephthalate or polyethylene naphthalate; polyolefins such as polypropylene; cellulose derivatives such as cellulose triacetate or cellulose diacetate; vinyl type resins such as polyvinyl chloride; plastics such as polycarbonate, polyamide or polysulphone; additionally metals such as aluminum or copper, and ceramics such as glass. A support may be subjected to corona discharge treatment, plasma treatment, undercoat treatment, heat treatment, dust and contaminants removal treatment, metal vapor deposition treatment, and alkali treatment. The description relating to the above support is disclosed in West German Patent No. 3,338,854A, Japanese Patent Application (OPI) No. 116926/84 (the term "OPI" as used herein refers to a "published unexamined Japanese patent application"), U.S. Pat. No. 4,388,368 and Yukio Miseki, *Seni to Kogyo (Fibers and Industry)*, Vol. 31, pp. 50–55, 1975.

The ferromagnetic particles or non-magnetic particles, binders, additives, solvents, and supports (which may have an underlayer, a backing layer and an underlayer for a backing layer) and a method for preparing a magnetic recording medium, which are used in the present invention, are disclosed in U.S. Pat. No. 4,135,016.

Suitable methods for coating the above-described magnetic recording layer on a support include an air doctor coating method, a blade coating method, an air knife coating method, a squeeze coating method, a dip coating method, a reverse roll coating method, a transfer roll coating method, a gravure coating method, a kiss coating method, a cast coating method, and a spray coating method, and other conventional methods can also be used. The specific explanation regarding these coating methods is disclosed in greater detail in *Coating Kogaku* (*Coating Engineering*), pp. 253–277, published by Asakura Shoten, Japan, on March 20, 1971.

The magnetic layer thus provided on a support is, if desired, subjected to magnetic orientation to have magnetic particles orientated in the layer while drying, and thereafter dried. The speed for carrying the support is generally from 10 m/min to 500 m/min, and the temperature for drying is adjusted to from 20° to 120° C. If desired, a surface smoothing treatment such as calendering treatment is conducted, and a magnetic layer is cut to a desired shape. Thus, a magnetic recording medium of the present invention is prepared. The method for preparing a magnetic recording medium is disclosed, for example, in Japanese Patent Publication Nos. 23625/65 and 28368/64 and U.S. Pat. No. 3,473,960. The method as disclosed in Japanese Patent Publication No. 13181/66 is considered to be fundamental and important in this field.

In the present invention, saturation magnetic flux density Bm can be significantly improved by controlling the conditions of mixing and kneading magnetic particles and binders so that magnetic particles and binders can be homogeneously blended with each other and by adjusting conditions of pressure and temperatures of the calendering treatment. Accordingly, the saturation magnetic flux density Bm can be improved by optimizing selection of both the former and latter conditions.

The present invention is further illustrated by the Example described below. It will be understood by those skilled in this art that materials (component), quantities (preparation ratio), and operation orders can be changed so long as the gist of the present invention is not essentially changed. Accordingly, the present invention is not limited to the following Example. In the Example, all parts are by weight.

EXAMPLE

As magnetic particles, Co-$\gamma$-$Fe_2O_3$ having various particle sizes, Co contents, and ratios of $Fe^{2+}/Fe^{3+}$ were used. The magnetic coating solution having the following composition was prepared and was coated on a polyethylene terephthalate non-magnetic support having a thickness of 13 $\mu$m, so that the dry thickness of the magnetic layer was 40 $\mu$m.

| Magnetic Coating Solution: | parts by weight |
|---|---|
| Ferromagnetic particles | 300 |
| Copolymer of vinyl chloride containing a sulfonic acid group | 30 |
| Urethane resin | 20 |
| Polyisocyanate | 10 |
| Carbon black | 8 |
| Abrasive agent ($\alpha$-$Al_2O_3$) | 5 |
| Lecithin | 3 |
| Lauric acid | 3 |
| Oleic acid | 3 |
| Butyl acetate | 100 |
| Methyl ethyl ketone | 150 |

The viscosity of the coating solution was adjusted and then the coating solution was coated on a polyethylene terephthalate support, subjected to orientation, dried, and was subjected to various calendering treatment to prepare Sample Nos. 1 to 18 as shown in the Table.

Reproduced RF (Radio Frequency) outputs and C/N (Carrier/Noise ratio) of the thus prepared magnetic recording medium were checked.

The reproduced RF outputs were measured using a commercially available VHS deck with a ferrite head at recording wavelengths of 1.2 $\mu$m and 0.73 $\mu$m.

Regarding C/N, the ratio of noise to the above-described reproduced RF outputs was measured.

The values of reproduced outputs and C/N were relative values relative to reproduced outputs of "Super XG-T-120" manufactured by Fuji Photo Film Co., Ltd., being assumed to be 0 dB.

The commercially available VHS tapes used for comparison were video tapes of "SHG Type" (manufactured by TDK Ltd., Hitachi Maxell Ltd., Victor Company of Japan Limited, Sony Corporation, Sumitomo 3M Co., Ltd., and Konishiroku Photo Industry Co., Ltd.).

TABLE

| Sample No. | Magnetic Characteristics | | | Electromagnetic Properties (dB) | | | |
|---|---|---|---|---|---|---|---|
| | Coercive Force Hc (Oe) | Saturation Magnetic Flux Density Bm (G) | Hc/Bm | $\lambda = 1.2\ \mu m$ | | $\lambda = 0.73\ \mu m$ | |
| | | | | Outputs | C/N | Outputs | C/N |
| 1 | 750 | 1,450 | 0.517 | 0.5 | 0.1 | 0 | −1.0 |
| 2 | 750 | 1,605 | 0.467 | 0.7 | 0.3 | 0.2 | −0.7 |
| 3 | 750 | 1,810 | 0.414 | 1.0 | 0.5 | 0.4 | −0.1 |
| 4 | 850 | 1,480 | 0.574 | 1.0 | 0.3 | 1.0 | 0.8 |
| 5* | 850 | 1,700 | 0.500 | 1.8 | 1.5 | 2.2 | 2.0 |
| 6* | 850 | 1,950 | 0.436 | 2.0 | 1.9 | 3.0 | 2.5 |
| 7* | 850 | 2,030 | 0.419 | 2.2 | 2.0 | 3.5 | 3.0 |
| 8* | 850 | 2,200 | 0.386 | 2.5 | 2.2 | 3.8 | 3.1 |
| 9* | 850 | 2,320 | 0.366 | 3.0 | 2.5 | 4.5 | 4.0 |
| 10 | 950 | 1,520 | 0.625 | 1.1 | 0.4 | 1.5 | 1.0 |
| 11 | 950 | 1,690 | 0.562 | 1.5 | 0.8 | 1.7 | 1.3 |
| 12* | 950 | 1,920 | 0.495 | 2.5 | 2.0 | 3.5 | 3.2 |
| 13* | 950 | 2,100 | 0.452 | 3.0 | 2.3 | 3.7 | 3.4 |
| 14* | 950 | 2,300 | 0.413 | 3.5 | 2.5 | 4.8 | 4.3 |
| 15 | 1,100 | 1,560 | 0.705 | 1.1 | 0.7 | 1.7 | 1.2 |

TABLE-continued

| Sample No. | Magnetic Characteristics | | | Electromagnetic Properties (dB) | | | |
| --- | --- | --- | --- | --- | --- | --- | --- |
| | Coercive Force Hc (Oe) | Saturation Magnetic Flux Density Bm (G) | Hc/Bm | $\lambda = 1.2\ \mu m$ | | $\lambda = 0.73\ \mu m$ | |
| | | | | Outputs | C/N | Outputs | C/N |
| 16 | 1,100 | 1,870 | 0.588 | 1.7 | 1.0 | 2.0 | 1.5 |
| 17 | 1,100 | 2,050 | 0.537 | 2.1 | 1.2 | 2.3 | 1.8 |
| 18* | 1,100 | 2,200 | 0.500 | 3.5 | 2.0 | 3.9 | 2.8 |
| Comparative Sample Commercially Available VHS Tape (SHG) | 600–700 | 1,500 | 0.40–0.47 | −1.5–0 | −1.5–0 | −2.5–0 | −2.3–0 |

*A mark (*) stands for samples of the present invention, and other samples with no mark are comparative samples.

As is clearly seen from the Table, samples of the present invention (Sample Nos. 5 to 9, 12 to 14 and 18) exhibit more excellent outputs and C/N than comparative samples.

While the invention has been described in detail and with reference to specific embodiments thereof, it will be apparent to one skilled in the art that various changes and modifications can be made therein without departing from the spirit and scope thereof.

What is claimed is:

1. A magnetic video tape recording medium having a magnetic layer comprising Co-adsorbed γ-iron oxide particles as ferromagnetic particles and binders containing a thermoplastic resin having at least one polar group selected from the group, consisting of

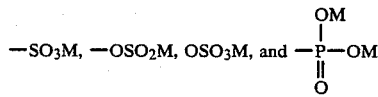

wherein M represents H, Li, Na or K wherein the coercive force Hc of the magnetic recording medium is 850 to 1,000 Oe and the ratio of the coercive force Hc and saturated magnetic flux density Bm thereof is from 0.3/1 to 0.5/1, wherein the squareness ratio of the residual magnetic flux density Br and saturated magnetic flux density Bm of said recording medium is from 0.87/1 to 0.95/1.

2. A magnetic recording medium as in claim 1, wherein the crystal size of the Co-absorbed γ-iron oxide particles is from 200 to 400 Å in the direction of the short axis.

3. A magnetic recording medium as in claim 1, wherein a squareness ratio of the residual magnetic flux density Br and the saturated magnetic flux density Bm thereof is 0.85/1 or more.

4. A magnetic recording medium as in claim 1, wherein the crystal size of the Co-adsorbed γ-iron oxide particles is from 200 to 300 Å in the direction of the short axis.

5. A magnetic recording medium as in claim 1, wherein a Co content of the ferromagnetic particles is 10 atom % or less based on a total weight of the cobalt and iron oxide particles, and the proportion of $Fe^{2+}$ with respect to $Fe^{3+}$ is 10% or less.

6. A magnetic recording medium as in claim 1, wherein a Co content of the ferromagnetic particles is from 4 to 7 atom % based on a total weight of the cobalt and iron oxide particles, and the proportion of $Fe^{2+}$ with respect to $Fe^{3+}$ is from 5 to 9%.

* * * * *